J. F. O'CONNOR.
FRICTION GEAR CASING.
APPLICATION FILED SEPT. 15, 1919.
1,372,716.
Patented Mar. 29, 1921.
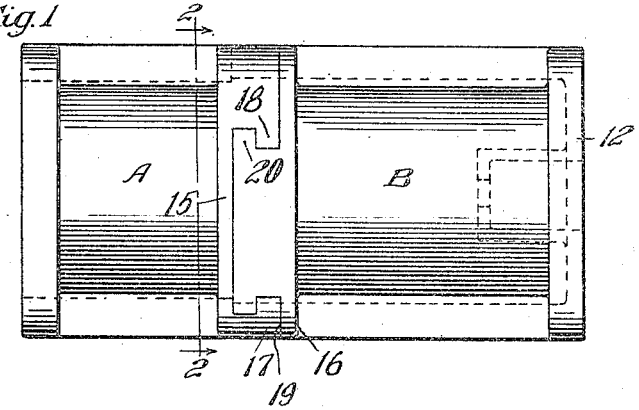
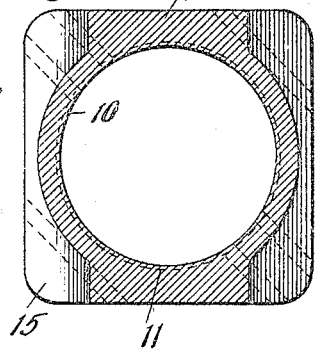
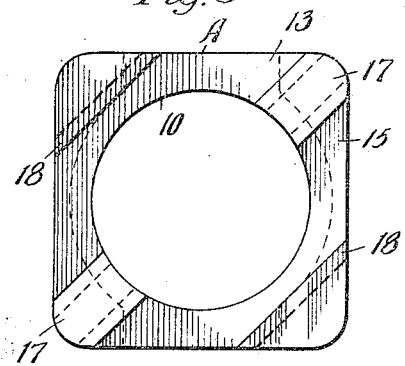
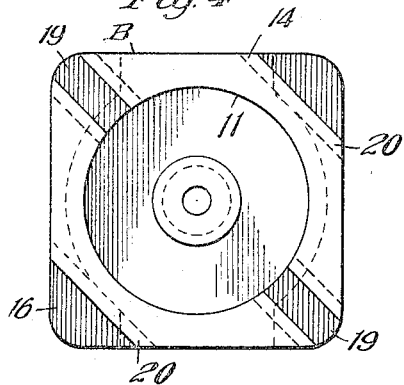
Witnesses
Wm. Geiger
Inventor
John F. O'Connor
By Geo. I. Haight.
Atty.

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION-GEAR CASING.

1,372,716. Specification of Letters Patent. Patented Mar. 29, 1921.

Application filed September 15, 1919. Serial No. 323,789.

*To all whom it may concern:*

Be it known that I, JOHN F. O'CONNOR, a citizen of the United States, residing at Chicago, in the county of Cook and State of Illinois, have invented a certain new and useful Improvement in Friction-Gear Casings, of which the following is a full, clear, concise, and exact description, reference being had to the accompanying drawings, forming a part of this specification.

This invention relates to improvements in friction gear casing.

In the art of railway draft riggings, it is well known that the parts of friction gears which wear most rapidly are those subject to the friction between moving elements and particularly that part known as the "friction shell." When the friction shell becomes unduly worn, it is necessary to replace the same and where the shell is formed as an integral component part of the usual spring cage, the cost of renewal is rendered excessive. Many attempts have, of course heretofore been made to provide friction shells which are separable or detachable without destructive effect, from the usual spring cage, some of these devices necessitating the use of bolts, keys or other extraneous elements to effect the connection between the shell and the spring cage. Other efforts have been made to provide a detachable connection between the shell and cage wherein the connecting means are formed integral with the shell and cage. The latter arrangement has been found preferable to the other type since it obviates the use of extra parts and a stronger connection is obtained as a general rule. Heretofore, however, where a detachable connection has been attempted between the friction shell and the spring cage, by means integral with the shell and cage, it has been found necessary to laterally or vertically extend the connecting parts so as to occupy a space greater than that occupied by the shell or cage itself where the latter are formed integral.

The object of my invention is to provide a friction gear casing which is comprised of a friction shell and spring cage detachably connected by means integral with the cage and shell and so designed that the over-all width and height of the improved casing, even at the point of detachable connection, is not enlarged above the over-all width and height of a corresponding friction gear casing wherein the shell and cage are made integral.

Another object of the invention is to provide a detachable friction shell and spring cage having the connecting elements formed integral therewith and which is suitable for interchange with friction gear casings now in actual service in which the shell and cage are formed integral and without the necessity of changing or rearranging any of the attachments of the draft rigging.

In the drawings forming a part of this specification, Figure 1 is a side elevation of a friction gear casing showing my improvements in connection therewith. Fig. 2 is a vertical sectional view taken on the line 2—2 of Fig. 1. Fig. 3 is an elevational view of the inner end of the friction shell proper. And Fig. 4 is a corresponding elevational view of the coöperating outer end of the spring cage.

In said drawing, the friction shell proper is designated by the reference A and the spring cage by the reference B. As customary in this well known type of friction gear, the inner friction surface of the shell A is made cylindrical as indicated at 10 and the interior of the cage B is of corresponding cylindrical form as indicated at 11 to accommodate the usual double coil spring. In this type of friction gear, as is customary, the rear end of the spring cage B is formed with a rectangular and substantially square wall indicated at 12 which acts as a rear follower. In actual practice, the rear follower 12 is approximately nine inches high and the same in width so that the device is suitable for use in conjunction with so-called nine-inch yokes. As is also customary, both the shell and the cage are provided on their upper and lower portions with additional metal as indicated at 13 in Fig. 3 and 14 in Fig. 4, thereby providing wide flat surfaces adjacent and coöperable with the upper and lower arms of the yoke.

To effect the detachable connection between the shell and cage by means formed integral on the shell and cage, I employ the following arrangement. The shell is provided at its inner end with a flange section indicated by the reference 15 in Fig. 3 and the cage B is formed with a corresponding flange section 16. These flange sections 15 and 16 are made substantially co-extensive with the rear follower 12 and in any event so as not to provide a larger area or over-all dimension. On one of these flanges, as for instance the flange 15 of the shell A, I provide a diagonally extending T-shaped rib 17, the same being of course interrupted or omitted at its central portion in accordance with the cylindrical interior of the friction shell. On the two diagonally disposed corners on opposite sides of the T-shaped rib or tongue 17, I provide under-cut diagonally extending flanges 18—18, it being understood that the flanges 18 and tongue 17 extend parallel. On the other part of the friction gear casing, the cage B, I provide on the outer face of the square flange 16, a diagonally extending under-cut T-shaped groove 19 to accommodate the tongue 17. Similarly on the diagonally disposed corners on opposite sides of the groove 19, I cut away the main flange 16 so as to leave under-cut diagonally extending flanges 20 which coöperate with the under-cut flanges 18 of the shell. As will be apparent, the two parts are assembled by sliding the one diagonally of the other with the tongues and flanges in proper engagement. After the parts are assembled, they will be prevented from slipping relatively to each other either by the friction elements within the casing or by the yoke and surrounding attachments or by a combination of both.

With the construction disclosed, it is evident that I effect a very strong detachable connection by parts formed integral with the shell and cage and at the same time maintain the over-all dimensions within the limits of the usual rear integral follower so that my improved device is readily interchangeable with the integral form of shell and cage type of friction gear casings now on the market and in service.

I claim:

In a device of the character described, the combination with a hollow friction shell having an interior friction surface and provided with a substantially rectangular flange at its inner end, of a hollow spring cage having the interior thereof, at its end adjacent the cage, of the same form and size as that of the shell and provided at its end adjacent the shell with a substantially rectangular flange, said flanges having diagonally extending coöperating integrally formed tongues and grooves adapting the shell and cage to be united by sliding one diagonally relatively to the other.

In witness that I claim the foregoing I have hereunto subscribed my name this 28th day of Aug. 1919.

JOHN F. O'CONNOR.